United States Patent
Hirsch et al.

(10) Patent No.: US 7,259,688 B2
(45) Date of Patent: Aug. 21, 2007

(54) WIRELESS RESERVOIR PRODUCTION CONTROL

(75) Inventors: John Michele Hirsch, Houston, TX (US); George Leo Stegemeier, Houston, TX (US); Harold J. Vinegar, Houston, TX (US); Robert Rex Burnett, Katy, TX (US); Frederick Gordon Carl, Jr., Houston, TX (US); William Mountjoy Savage, Houston, TX (US); James William Hall, Houston, TX (US)

(73) Assignee: Shell Oil Company, Houston, TX (US)

( * ) Notice: Subject to any disclaimer, the term of this patent is extended or adjusted under 35 U.S.C. 154(b) by 434 days.

(21) Appl. No.: 10/220,254

(22) PCT Filed: Mar. 2, 2001

(86) PCT No.: PCT/US01/06985

§ 371 (c)(1),
(2), (4) Date: Aug. 29, 2002

(87) PCT Pub. No.: WO01/65068

PCT Pub. Date: Sep. 7, 2001

(65) Prior Publication Data

US 2003/0038734 A1  Feb. 27, 2003

Related U.S. Application Data

(60) Provisional application No. 60/177,999, filed on Jan. 24, 2000, provisional application No. 60/178,000, filed on Jan. 24, 2000, provisional application No. 60/178,001, filed on Jan. 24, 2000, provisional application No. 60/177,883, filed on Jan. 24, 2000, provisional application No. 60/177,998, filed on Jan. 24, 2000, provisional application No. 60/177,997, filed on Jan. 24, 2000, provisional application No. 60/181, (Continued)

(51) Int. Cl.
*G01V 1/00* (2006.01)

(52) U.S. Cl. .............................. 340/854.4; 340/853.1; 166/335

(58) Field of Classification Search ............. 340/853.1, 340/870.09, 854.4, 853.4; 166/53, 319, 332.5, 166/250.01, 771; 702/6
See application file for complete search history.

U.S. PATENT DOCUMENTS 525,663 A    9/1894   Mottinger (Continued)

FOREIGN PATENT DOCUMENTS

EP           28296       5/1981
EP           295178 A2   12/1988

(Continued)

OTHER PUBLICATIONS

Brown, Connolizo and Robertson. West Texas Oil Lifting Short Course and H.W. Winkler. "Misunderstood or overlooked Gas-Lift Design and Equipment Considerations." SPE, p. 351 (1994).

(Continued)

*Primary Examiner*—Brian Zimmerman
*Assistant Examiner*—Hung Q Dang
(74) *Attorney, Agent, or Firm*—Rachel A. Stiegel

(57) ABSTRACT

A reservoir production control system includes a plurality of wells for producing a reservoir linked to a central computer over a downhole communication network and a surface communication network. Both the downhole and the surface communication networks are wireless communications paths for transmitting downhole data and surface data to the central computer. Both networks include a series of interconnected tubing or pipe that allows transmission of data over electrically isolated portions of the pipe and tubing. After integrating and analyzing all relevant data and comparing the data with a reservoir model, the central computer initiates changes in a plurality of downhole control devices associated with the wells, thereby optimizing the production of the reservoir.

28 Claims, 3 Drawing Sheets

Related U.S. Application Data 322,filed on Feb. 9, 2000, provisional application No. 60/186,376, filed on Mar. 2, 2000, provisional application No. 60/186,380, filed on Mar. 2, 2000, provisional application No. 60/186,505, filed on Mar. 2, 2000, provisional application No. 60/186,504, filed on Mar. 2, 2000, provisional application No. 60/186,379, filed on Mar. 2, 2000, provisional application No. 60/186,394, filed on Mar. 2, 2000, provisional application No. 60/186,382, filed on Mar. 2, 2000, provisional application No. 60/186,503, filed on Mar. 2, 2000, provisional application No. 60/186,527, filed on Mar. 2, 2000, provisional application No. 60/186,393, filed on Mar. 2, 2000, provisional application No. 60/186,531, filed on Mar. 2, 2000, provisional application No. 60/186,377, filed on Mar. 2, 2000, provisional application No. 60/186,381, filed on Mar. 2, 2000, provisional application No. 60/186,378, filed on Mar. 2, 2000, provisional application No. 60/186,394, filed on Mar. 2, 2000, provisional application No. 60/186,504, filed on Mar. 2, 2000, provisional application No. 60/186,379, filed on Mar. 2, 2000, provisional application No. 60/186,675, filed on Mar. 2, 2000, provisional application No. 60/186,382, filed on Mar. 2, 2000, provisional application No. 60/186,503, filed on Mar. 2, 2000, provisional application No. 60/220,253, filed on Mar. 2, 2000, provisional application No. 60/186,393, filed on Mar. 2, 2000, provisional application No. 60/186,394, filed on Mar. 2, 2000, provisional application No. 60/186,531, filed on Mar. 2, 2000, provisional application No. 60/186,377, filed on Mar. 2, 2000, provisional application No. 60/186,381, filed on Mar. 2, 2000, provisional application No. 60/186,378, filed on Mar. 2, 2000, provisional application No. 60/186,505, filed on Mar. 2, 2000.

U.S. PATENT DOCUMENTS

| Patent No. | | Date | Inventor | Class |
|---|---|---|---|---|
| 2,083,321 | A | 8/1937 | Dunn et al. | 106/34 |
| 2,257,663 | A | 9/1941 | Albrecht | 250/36 |
| 2,379,800 | A | 3/1945 | Hare | 175/356 |
| 2,414,719 | A | 1/1947 | Cloud | 178/44 |
| 2,917,004 | A | 12/1959 | Davis et al. | |
| 3,083,771 | A | 4/1963 | Chapman | |
| 3,087,545 | A | 4/1963 | O'Brien | 166/39 |
| 3,247,904 | A | 4/1966 | Wakefield, Jr. | |
| 3,427,989 | A | 2/1969 | Bostock et al. | |
| 3,465,273 | A | 9/1969 | Brock | 336/62 |
| 3,566,963 | A | 3/1971 | Blackledge | 166/189 |
| 3,602,305 | A | 8/1971 | Kisling, III | 116/134 |
| 3,659,336 | A | 5/1972 | Horne | 29/605 |
| 3,732,728 | A | 5/1973 | Fitzpatrick | 73/151 |
| 3,793,632 | A | 2/1974 | Still | 340/18 |
| 3,814,545 | A | 6/1974 | Waters | 417/90 |
| 3,837,618 | A | 9/1974 | Juhel | 251/129 |
| 3,980,826 | A | 9/1976 | Widmer | 178/68 |
| 4,068,717 | A | 1/1978 | Needham | 166/272 |
| 4,087,781 | A | 5/1978 | Grossi et al. | 340/18 |
| 4,295,795 | A | 10/1981 | Gass et al. | 417/111 |
| 4,350,205 | A | 9/1982 | Goldschild et al. | 166/375 |
| 4,393,485 | A | 7/1983 | Redden | 367/25 |
| 4,468,665 | A | 8/1984 | Thawley et al. | 340/856 |
| 4,545,731 | A | 10/1985 | Canalizo et al. | 417/86 |
| 4,566,534 | A | 1/1986 | Going, III | 166/66.4 |
| 4,576,231 | A | 3/1986 | Dowling et al. | 166/248 |
| 4,578,675 | A | 3/1986 | MacLeod | 340/855 |
| 4,596,516 | A | 6/1986 | Scott et al. | 417/58 |
| 4,630,243 | A | 12/1986 | MacLeod | 367/82 |
| 4,648,471 | A | 3/1987 | Bordon | 175/4.55 |
| 4,662,437 | A | 5/1987 | Renfro | 166/65.1 |
| 4,681,164 | A | 7/1987 | Stacks | 166/304 |
| 4,709,234 | A | 11/1987 | Forehand et al. | 340/856 |
| 4,738,313 | A | 4/1988 | McKee | 166/372 |
| 4,739,325 | A | 4/1988 | MacLeod | 340/854 |
| 4,771,635 | A | 9/1988 | Trevillion | 73/155 |
| 4,790,375 | A | 12/1988 | Bridges et al. | 166/60 |
| 4,793,414 | A | 12/1988 | Nguyen et al. | 166/252 |
| 4,839,644 | A | 6/1989 | Safinya et al. | 340/854 |
| 4,852,648 | A | 8/1989 | Akkerman et al. | 166/66.4 |
| 4,886,114 | A | 12/1989 | Perkins et al. | 166/65.1 |
| 4,901,069 | A | 2/1990 | Veneruso | 340/853 |
| 4,933,640 | A | 6/1990 | Kuckes | 324/339 |
| 4,972,704 | A | 11/1990 | Wellington et al. | 73/155 |
| 4,981,173 | A | 1/1991 | Perkins et al. | 166/66.4 |
| 5,001,675 | A | 3/1991 | Woodward | 367/13 |
| 5,008,664 | A | 4/1991 | More et al. | 340/854 |
| 5,031,697 | A | 7/1991 | Wellington et al. | 166/250 |
| 5,034,371 | A | 7/1991 | Tanaka et al. | 503/227 |
| 5,130,706 | A | 7/1992 | Van Steenwyk | 340/854.6 |
| 5,134,285 | A | 7/1992 | Perry et al. | 250/269 |
| 5,160,925 | A | 11/1992 | Dailey et al. | 340/853.3 |
| 5,162,740 | A | 11/1992 | Jewell | 324/347 |
| 5,172,717 | A | 12/1992 | Boyle et al. | 137/155 |
| 5,176,164 | A | 1/1993 | Boyle | 137/155 |
| 5,191,326 | A | 3/1993 | Montgomery | 340/855.5 |
| 5,216,285 | A | 6/1993 | Hilsenteger et al. | 307/12 |
| 5,230,383 | A | 7/1993 | Pringle et al. | 166/66.4 |
| 5,236,048 | A | 8/1993 | Skinner et al. | 166/382 |
| 5,246,860 | A | 9/1993 | Hutchins et al. | 436/27 |
| 5,251,328 | A | 10/1993 | Shaw | 455/73 |
| 5,257,663 | A | 11/1993 | Pringle et al. | 166/66.4 |
| 5,267,469 | A | 12/1993 | Espinoza | 73/40.5 |
| 5,278,758 | A | 1/1994 | Perry et al. | 364/422 |
| 5,326,970 | A | 7/1994 | Bayless | 250/269 |
| 5,331,318 | A | 7/1994 | Montgomery | 340/855.4 |
| 5,353,627 | A | 10/1994 | Diatschenko et al. | 73/19.03 |
| 5,358,035 | A | 10/1994 | Grudzinski | 166/53 |
| 5,367,694 | A | 11/1994 | Ueno | 395/800 |
| 5,394,141 | A | 2/1995 | Soulier | 340/854.4 |
| 5,396,232 | A | 3/1995 | Mathieu et al. | 340/854.5 |
| 5,425,425 | A | 6/1995 | Bankston et al. | 166/377 |
| 5,447,201 | A | 9/1995 | Mohn | 166/375 |
| 5,458,200 | A | 10/1995 | Lagerlef et al. | 166/372 |
| 5,467,083 | A | 11/1995 | McDonald et al. | 340/854.6 |
| 5,473,321 | A | 12/1995 | Goodman et al. | 340/854.9 |
| 5,493,288 | A | 2/1996 | Henneuse | 340/854.4 |
| 5,531,270 | A | 7/1996 | Fletcher et al. | 166/53 |
| 5,535,828 | A | 7/1996 | der Kinderen et al. | 166/372 |
| 5,561,245 | A | 10/1996 | Georgi et al. | 73/152.02 |
| 5,574,374 | A | 11/1996 | Thompson et al. | 324/338 |
| 5,576,703 | A | 11/1996 | MacLeod et al. | 340/854.4 |
| 5,587,707 | A | 12/1996 | Dickie et al. | |
| 5,592,438 | A | 1/1997 | Rorden et al. | 367/83 |
| 5,662,165 | A | 9/1997 | Tubel et al. | 166/250.01 |
| 5,721,538 | A * | 2/1998 | Tubel et al. | 340/853.4 |
| 5,723,781 | A | 3/1998 | Pruett et al. | 73/152.18 |
| 5,730,219 | A | 3/1998 | Tubel et al. | 66/250.01 |
| 5,745,047 | A | 4/1998 | Van Gisbergen et al. | 340/853.1 |
| 5,760,892 | A | 6/1998 | Koyama | 356/237 |
| 5,782,261 | A | 7/1998 | Becker et al. | 137/155 |
| 5,797,453 | A | 8/1998 | Becker et al. | 166/117.5 |
| 5,881,807 | A | 3/1999 | Boe et al. | 166/100 |
| 5,883,516 | A | 3/1999 | Van Steenwyk et al. | 324/366 |
| 5,887,657 | A | 3/1999 | Bussear et al. | 166/336 |
| 5,896,924 | A | 4/1999 | Carmody et al. | 166/53 |
| 5,934,371 | A | 8/1999 | Bussear et al. | 166/53 |
| 5,937,945 | A | 8/1999 | Bussear et al. | 166/250.15 |
| 5,941,307 | A | 8/1999 | Tubel | 166/313 |
| 5,942,990 | A | 8/1999 | Smith et al. | 340/853.7 |
| 5,955,666 | A | 9/1999 | Mullins | 73/52.18 |
| 5,959,499 | A | 9/1999 | Khan et al. | 330/149 |
| 5,960,883 | A | 10/1999 | Tubel et al. | 166/313 |
| 5,963,090 | A | 10/1999 | Fukuchi | 330/149 |
| 5,971,072 | A | 10/1999 | Huber et al. | 166/297 |
| 5,975,204 | A | 11/1999 | Tubel et al. | 166/250.15 |

| | | | | |
|---|---|---|---|---|
| 5,975,504 A | 11/1999 | Nutter et al. | | |
| 5,995,020 A * | 11/1999 | Owens et al. | ............ | 340/854.9 |
| 6,012,015 A * | 1/2000 | Tubel | ............................ | 702/6 |
| 6,012,016 A | 1/2000 | Bilden et al. | .................. | 702/12 |
| 6,037,767 A | 3/2000 | Crescenzo et al. | ........... | 324/220 |
| 6,061,000 A | 5/2000 | Edwards | .................... | 340/854.6 |
| 6,070,608 A | 6/2000 | Pringle | ........................ | 137/155 |
| 6,089,322 A | 7/2000 | Kelley et al. | ................ | 166/370 |
| 6,123,148 A | 9/2000 | Oneal | ......................... | 166/118 |
| 6,128,508 A | 10/2000 | Francisco et al. | ........... | 455/552 |
| 6,148,915 A | 11/2000 | Mullen et al. | ................ | 166/278 |
| 6,189,621 B1 | 2/2001 | Vail, III | ....................... | 166/385 |
| 6,192,983 B1 | 2/2001 | Neuroth et al. | ......... | 166/250.15 |
| 6,208,586 B1 | 3/2001 | Rorden et al. | ................. | 367/35 |
| 6,310,534 B1 | 10/2001 | Brunner | ....................... | 336/174 |
| 6,334,486 B1 | 1/2002 | Carmody et al. | .............. | 166/53 |
| 6,344,781 B1 | 2/2002 | Slenker | ......................... | 333/181 |
| 6,348,876 B1 | 2/2002 | Wei et al. | .................. | 340/854.9 |
| 6,349,766 B1 | 2/2002 | Bussear et al. | .............. | 166/113 |
| 6,352,109 B1 | 3/2002 | Buckman, Sr. | ......... | 166/250.03 |
| 6,420,976 B1 * | 7/2002 | Baggs et al. | .............. | 340/853.3 |
| 6,429,784 B1 | 8/2002 | Beique et al. | ........... | 340/853.2 |
| 6,443,228 B1 | 9/2002 | Aronstam et al. | ...... | 166/250.11 |
| 6,445,307 B1 | 9/2002 | Rassi et al. | ............... | 340/854.6 |
| 6,464,004 B1 | 10/2002 | Crawford et al. | ....... | 166/250.01 |
| 6,484,800 B2 | 11/2002 | Carmody et al. | .............. | 166/53 |
| 6,515,592 B1 | 2/2003 | Babour et al. | ............ | 340/854.4 |
| 6,633,164 B2 | 10/2003 | Vinegar et al. | .............. | 324/355 |
| 6,633,236 B2 | 10/2003 | Vinegar et al. | ........... | 340/854.4 |
| 6,662,875 B2 * | 12/2003 | Bass et al. | ................... | 166/369 |
| 6,679,332 B2 | 1/2004 | Vinegar et al. | .............. | 166/373 |
| 6,737,951 B1 | 5/2004 | Decristofaro et al. | ........ | 336/234 |
| 6,747,569 B2 | 6/2004 | Hill et al. | ................. | 340/855.8 |
| 6,758,277 B2 | 7/2004 | Vinegar et al. | .............. | 166/372 |
| 6,817,412 B2 * | 11/2004 | Haase | .................... | 166/250.01 |
| 6,958,704 B2 | 10/2005 | Vinegar et al. | ........... | 340/854.3 |
| 2003/0056952 A1 | 3/2003 | Stegemeier et al. | ... | 166/250.12 |
| 2003/0086652 A1 | 5/2003 | Boudreau et al. | .............. | 385/49 |
| 2003/0131991 A1 | 7/2003 | Hartog et al. | ........... | 166/250.12 |

FOREIGN PATENT DOCUMENTS

| | | |
|---|---|---|
| EP | 339825 | 11/1989 |
| EP | 492856 A2 | 7/1992 |
| EP | 641916 A2 | 3/1995 |
| EP | 681090 A2 | 11/1995 |
| EP | 697500 A2 | 2/1996 |
| EP | 0 721 053 A1 | 7/1996 |
| EP | 732053 A1 | 9/1996 |
| EP | 919696 A2 | 6/1999 |
| EP | 922835 A2 | 6/1999 |
| EP | 930518 A2 | 7/1999 |
| EP | 0 964 134 A2 | 12/1999 |
| EP | 972909 A2 | 1/2000 |
| EP | 999341 A2 | 5/2000 |
| EP | 1352416 | 10/2003 |
| FR | 2677134 | 12/1992 |
| FR | 2695450 | 11/1994 |
| GB | 2083321 A | 3/1982 |
| GB | 2325949 A | 12/1998 |
| GB | 2327695 A | 2/1999 |
| GB | 2338253 A | 12/1999 |
| RU | 2129208 | 4/1999 |
| WO | 80/00727 | 4/1980 |
| WO | 93/26115 | 12/1993 |
| WO | 96/00836 | 1/1996 |
| WO | 96 24747 | 8/1996 |
| WO | 97/16751 | 5/1997 |
| WO | 97/37103 | 10/1997 |
| WO | 98/20233 | 5/1998 |
| WO | 99/37044 | 7/1999 |
| WO | 99/57417 | 11/1999 |
| WO | 99 60247 | 11/1999 |
| WO | 00/04275 | 1/2000 |
| WO | 00/37770 | 6/2000 |
| WO | 01/20126 A2 | 3/2001 |
| WO | 01/65718 A2 | 7/2001 |
| WO | 01/55555 A1 | 8/2001 |

OTHER PUBLICATIONS

Der Spek. Alex, and Aliz Thomas. "Neural-Net Identification of Flow Regime with Band Spectra of Flow-Generated Sound". SPE Reservoir Eva. & Eng.2 (6) Dec. 1999. pp. 489-498.

Sakata et al.. "Performance Analysis of Long Distance Transmitting of Magnetic Signal on Cylindrical Steel Rod", IEEE Translation Journal on magnetics in Japan. vol. 8. No. 2. Feb. 1993.. pp. 102-106.

Otis Engineering, Aug. 1980, "Heavy Crude Lift System", Field Development Report, OEC 5228, Otis Corp., Dallas, Texas, 1980.

Office Action dated Sep. 22, 2003, U.S. Appl. No. 09/769,048, Bass.

Office Action dated Jan. 29, 2003, U.S. Appl. No. 09/769,048, Bass.

Office Action dated Oct. 24, 2003, U.S. Appl. No. 09/768,705, Vinegar.

Office Action dated Feb. 21, 2003, U.S. Appl. No. 09/769,705, Vinegar.

Office Action dated Feb. 28, 2002, U.S. Appl. No. 09/768,705, Vinegar.

Office Action dated Apr. 8, 2005, U.S. Appl. No. 10/220,253, Hirsch.

Office Action dated Jan. 13, 2005, U.S. Appl. No. 10/220,195, Vinegar.

Office Action dated Sep. 1, 2004, U.S. Appl. No. 10/220,195, Vinegar.

Office Action dated Jun. 3, 2004, U.S. Appl. No. 10/220,195, Vinegar.

Office Action dated Nov. 12, 2003, U.S. Appl. No. 10/220,195, Vinegar.

U.S. Appl. No. 10/220,254, Filing Date, Aug. 29, 2002, Office Action—dated Sep. 19, 2005, Inventor, John M. Hirsch.

U.S. Appl. No. 10/220,254, Filing Date, Aug. 29, 2002, Office Action—dated Apr. 6, 2005, Inventor, John M. Hirsch.

U.S. Appl. No. 10/220,455, Filing Date, Aug. 29, 2002, Office Action—dated May 18, 2004, Inventor, John M. Hirsch.

U.S. Appl. No. 10/220,455, Filing Date, Aug. 29, 2002, Office Action—dated Nov. 19, 2003, Inventor, John M. Hirsch.

U.S. Appl. No. 09/768,705, Filing Date, Jan. 24, 2001, Office Action—dated Oct. 24, 2003, Inventor, Harold J. Vinegar.

U.S. Appl. No. 09/768,705, Filing Date, Jan. 24, 2001, Office Action—dated Feb. 21, 2003, Inventor, Harold J. Vinegar.

U.S. Appl. No. 09/768,705, Filing Date, Feb. 28, 2002, Office Action—dated Oct. 24, 2003, Inventor, Harold J. Vinegar.

U.S. Appl. No. 09/769,048, Filing Date, Jan. 24, 2001, Office Action—dated Sep. 22, 2003, Inventor, Ronald M. Bass.

U.S. Appl. No. 10/220,252, Filing Date, Aug. 29, 2002, Office Action—dated Sep. 22, 2005, Inventor, Harold J. Vinegar.

U.S. Appl. No. 10/220,252, Filing Date, Aug. 29, 2002, Office Action—dated Jul. 7, 2005, Inventor, Harold J. Vinegar.

U.S. Appl. No. 10/220,252, Filing Date, Aug. 29, 2002, Office Action—dated Aug. 13, 2004, Inventor, Harold J. Vinegar.

U.S. Appl. No. 10/220,252, Filing Date, Aug. 29, 2002, Office Action—dated Jan. 2, 2004, Inventor, Harold J. Vinegar.

U.S. Appl. No. 10/220,195, Filing Date, Aug. 28, 2002, Office Action—dated Jan. 13, 2005, Inventor, Harold J. Vinegar.

U.S. Appl. No. 10/220,195, Filing Date, Aug. 28, 2002, Office Action—dated Sep. 13, 2004, Inventor, Harold J. Vinegar.

U.S. Appl. No. 10/220,195, Filing Date, Aug. 28, 2002, Office Action—dated Jun. 3, 2004, Inventor, Harold J. Vinegar.

U.S. Appl. No. 10/220,195, Filing Date, Aug. 28, 2002, Office Action—dated Nov. 12, 2003, Inventor, Harold J. Vinegar.

U.S. Appl. No. 10/220,253, Filing Date, Aug. 29, 2002, Office Action—dated Apr. 8, 2005, Inventor, John M. Hirsch.

* cited by examiner

WIRELESS RESERVOIR PRODUCTION CONTROL

CROSS-REFERENCE TO RELATED APPLICATIONS

This application claims the benefit of the following U.S. Provisional Applications under 35 U.S.C. 119(e), all of which are hereby incorporated by reference:

The current application shares some specification and figures with the following commonly owned and concurrently filed applications, all of which are hereby incorporated by reference:

The applications referenced in the tables above are referred to herein as the "Related Applications."

BACKGROUND OF THE INVENTION

1. Field of the Invention

The present invention relates in general to reservoir optimization and more specifically to petroleum wells having downhole independently addressable wireless measurement and control devices that communicate with surface power and telemetry devices such that production from individual zones within individual wells may be coordinated to optimize overall reservoir production.

2. Description of Related Art

Oil and gas reservoirs are extensive three-dimensional subsurface geological structures whose fluid contents are produced through arrays of wells which withdraw fluids from the reservoir only at points where the wells pass through the producing zones. As fluids are withdrawn at the wells, pressure differentials develop within the reservoir which in turn create displacement of fluids from more distant reservoir regions towards the producing wells. To assist in sweeping desired fluids towards the producing wells, it is common practice in some fields to pump water or other fluids into wells which are designated injection wells.

To assist in comprehending the changing condition of the reservoir and thus manage production from individual wells to optimize recovery from the field overall, it is common practice to develop a reservoir model which reflects the relevant characteristics of the formation's fixed matrix such as porosity and permeability, and the composition, pressure, and temperature of the fluids contained within that matrix. The parameters of both the matrix and the fluids are expected to change as fluids are withdrawn from the producing wells and injection fluids are introduced at the injection wells. Since the geological formations of the reservoir are generally heterogeneous, the starting values of the matrix and fluid parameters are spatial variables, and as production evolves the changes in these parameters are also spatially variable in addition to being time dependent.

The data used to generate a reservoir model come from many sources. Three-dimensional seismic surveys provide stratigraphy and faulting, and wireline logging, existing well production histories provide, and to a lesser extent seismic surveys, provide data on formation fluids.

The starting values of the reservoir model parameters adjacent to each well can be measured relatively easily using wireline logging tools before each well is cased, but once production has commenced the presence of the well casing prevents many of the measurements which can be made in an open hole. Even measurements which could be made through the casing are usually not performed in existing practice since doing so would require either removing the production hardware and tubing from the well and running cased hole wireline logs, or the use of permanent downhole sensors connected to surface equipment by cables which extend the full depth of the well. These cables are expensive, are not entirely reliable, often introduce operational problems, and their installation at the time of completion complicates that process. The same issue of requiring cables to operate downhole control equipment such as valves also discourages the use of such devices. When downhole control devices are absolutely required, the provision of permanently installed cables can be avoided by using slickline tools, but cost prevents these from altering the settings of downhole devices at frequent intervals.

All references cited herein are incorporated by reference to the maximum extent allowable by law. To the extent a reference may not be fully incorporated herein, it is incorporated by reference for background purposes and indicative of the knowledge of one of ordinary skill in the art.

BRIEF SUMMARY OF THE INVENTION

The difficulties inherent with restricted measurement and control are largely resolved by methods in accordance with the present invention. Wireless power and communications as described in the Related Applications enable the wells to provide real-time measurement of downhole conditions to update the reservoir model, and based on predictions made from the model, the well production is controlled to optimize field performance. The objective function for production optimization may be altered over time as product market conditions shift, production costs vary, or physical plant capabilities are changed.

The invention and development of wireless communication and electrical power transmission and control by means of pipes and tubing introduces the opportunity for widespread collection of oil field data, both (1) at the surface, through the network of facilities piping and injection and production distribution lines, and (2) in the subsurface, through well casing and tubing. The amounts and types of data that could be collected and the degree of control in remote parts of the units would provide a major advance in management of single wells, whole fields, or even company-wide assets.

DETAILED DESCRIPTION OF THE PREFERRED EMBODIMENT

Figure 1:
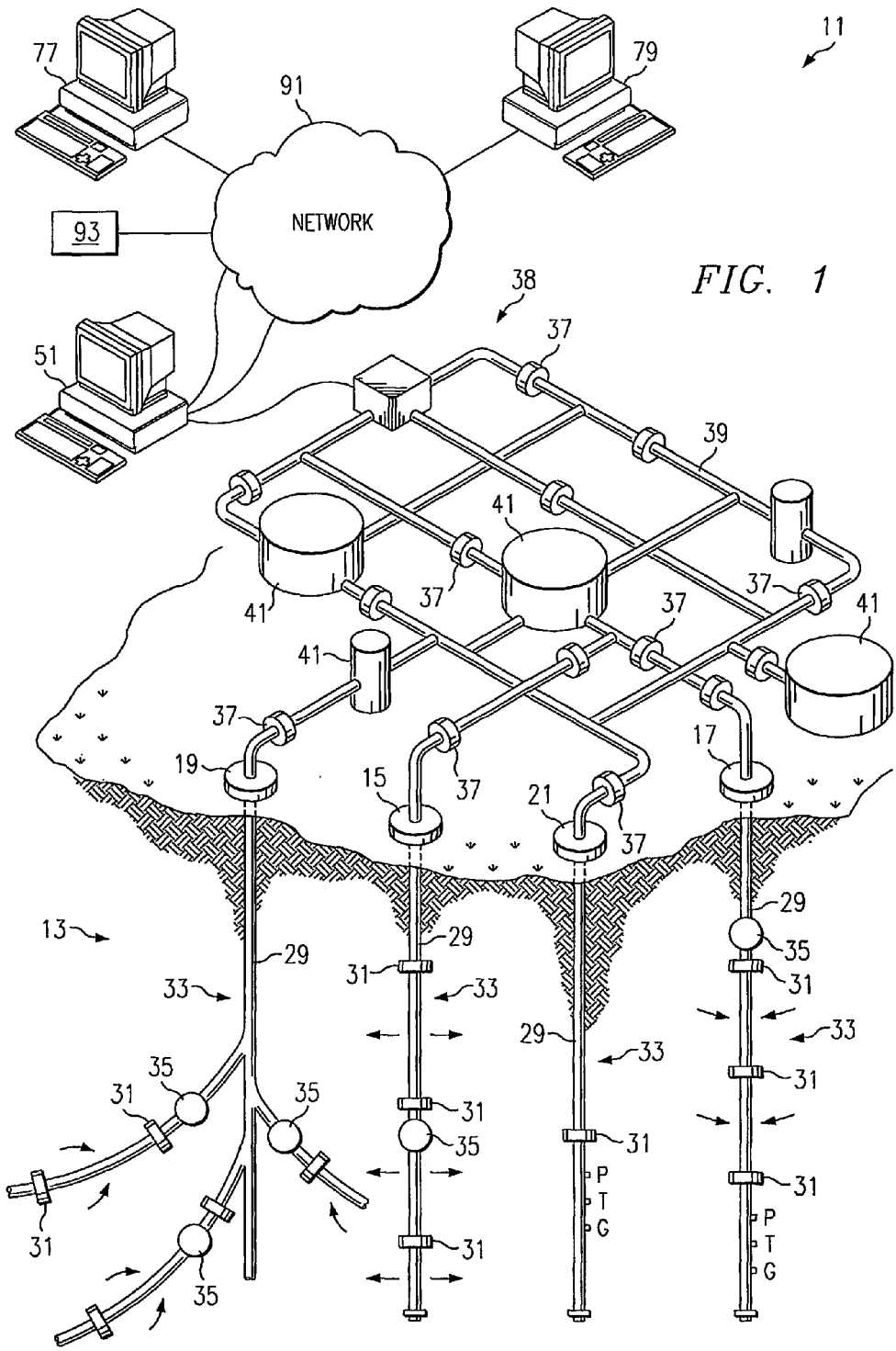
FIG. 1 schematically illustrates a reservoir production control system according to the present invention being implemented on a company-wide basis to optimize the production of a plurality of reservoirs.

Referring to FIG. 1 in the drawings, a reservoir production control system 11 according to the present invention is illustrated. Reservoir production control system 11 is used to optimize the production of one or more reservoirs. A reservoir 13 includes a plurality of wells 15, 17, 19, 21 completed in the subsurface for producing oil and gas reserves from reservoir 13. The exact number and type of wells present in a particular reservoir could vary significantly from reservoir to reservoir. In FIG. 1, well 15 is an injection well, well 17 is a conventional production well, well 19 is a multi-lateral production well, and well 21 is a data observation well. Each well includes a borehole that begins at a surface of the well and continues into a production zone within the reservoir. Preferably, the wells include casing that is cemented in the borehole during completion of the well. A tubing string or production tubing 29 is located in the borehole of each well.

Wireless data receptors or downhole data pods 31 are distributed in the boreholes of the wells. Downhole data pods 31 send and receive data along a downhole communication network 33. Preferably, the downhole communication network allows transmission of data signals along an electrically isolated portion of the tubing string. In most cases, the electrically isolated portion of the tubing string is created between two ferromagnetic chokes placed on the tubing string. The transmission of data using such electrically isolated sections of pipe or tubing is described more fully in U.S. patent application Ser. No. 60/177,999, entitled "Toroidal Choke Inductor for Wireless Communication and Control," filed Jan. 24, 2000, and U.S. patent application Ser. No. 60/178,000, entitled "Ferromagnetic Choke in Wellhead," filed Jan. 24, 2000, which are both hereby incorporated by reference. Pods 31 may also be equipped to collect data about downhole physical characteristics of the well, including pressure, temperature, acoustic noise, seismic signals, resistivity, fluid turbidity, infrared response, flow rate in the pipe, vibration, or other measurements useful for monitoring the well. This data collection would be accomplished in the manner described in U.S. patent application Ser. No. 60/177,998, entitled "Petroleum Well Having Downhole Sensors, Communication, and Power," filed Jan. 24, 2000, which is hereby incorporated by reference. Collected data would be transmitted to the surface of the well over the downhole communication network 33 using the methods described in U.S. patent application Ser. No. 60/177,999, entitled "Toroidal Choke Inductor for Wireless Communication and Control," filed Jan. 24, 2000, and U.S. patent application Ser. No. 60/178,000, entitled "Ferromagnetic Choke in Wellhead," filed Jan. 24, 2000. In some cases pod 31 would be equipped to operate accompanying downhole control devices 35, which could include a submersible pump or a controllable gas-lift valve for modifying the flow rate of oil within the production tubing 29. The downhole control device 35 could also include a chemical injector for injecting treatment chemicals such as corrosion inhibitors, scale inhibitor, foaming agents and paraffin solvents. The operation of downhole valves using the power transmission and communication techniques described above is more fully described in U.S. patent application Ser. No. 60/178,001, entitled "Controllable Gas-Lift Well and Valve," filed Jan. 24, 2000, which is hereby incorporated by reference. Detection of failures of downhole equipment, such as gas-lift valve leakage, electric submersible pump vibration, and rod pump noise, would allow early remedial efforts that would improve productivity of the wells.

In addition to placement of wireless devices in the subsurface portions of the wells, a plurality of surface data pods 37 may be placed in a surface communication network 38 of interconnected pipes 39. The interconnected pipes 39 are common in oil field operations and are generally used to fluidly connect the wells to tanks and separators 41. Each of the interconnected pipes is also a potential data transmission path when a section of the pipes can be electrically isolated as described in U.S. patent application Ser. No. 60/177,999, entitled "Toroidal Choke Inductor for Wireless Communication and Control," filed Jan. 24, 2000, and U.S. patent application Ser. No. 60/178,000, entitled "Ferromagnetic Choke in Wellhead," filed Jan. 24, 2000. Preferably, the electrically isolated portions of the interconnected pipes are located between ferromagnetic chokes placed on the pipes. The wireless devices at the surface would interact with the subsurface devices to optimize well production in view of any operational constraints at the surface. These constraints might be (1) available gas for gas lift, (2) supply of water or other fluids for flooding projects, (3) upsets in production facilities such as oil/water separation, (4) emulsion control, and (5) other common occurrences encountered in manual operations.

Control of all of the operations described above resides in a central data collection computer 51, which will have a reservoir model with which to compare the actual behavior of the reservoir being monitored by downhole data pods 31. Reservoir conditions that change with time are often unattainable after wells have been completed and pipe cemented in place. With permanent pressure monitors available for timely pressure transient analyses, the progress of depletion of a reservoir can be closely monitored. Deviations from expected behavior, can be analyzed and in some cases, such as poor profile control, may be corrected by the downhole control devices 35, or by well workovers.

Figure 2:
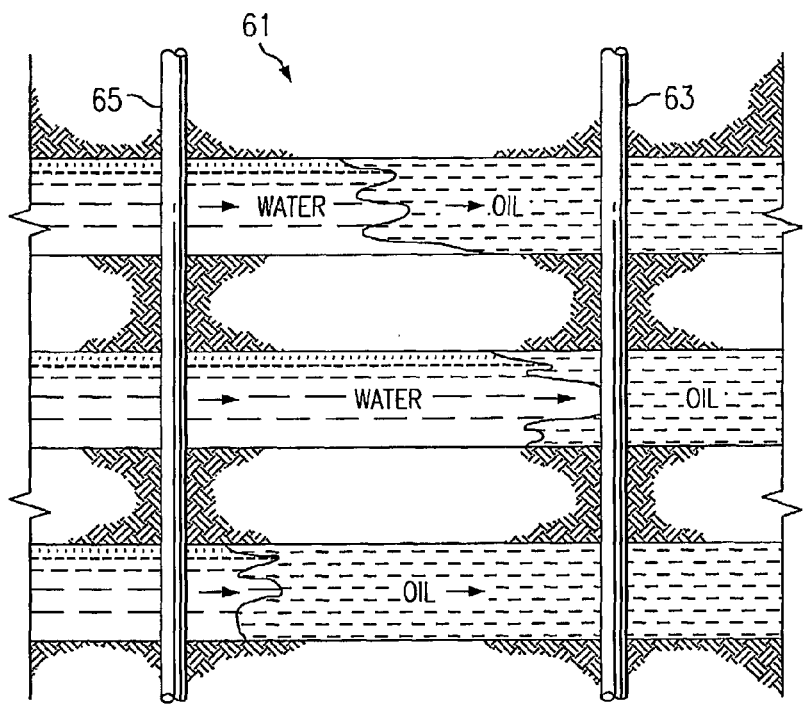
FIG. 2 depicts secondary production operations in a multi-layer reservoir being produced by two wells.

Permanently installed resistivity monitors in producing wells would be effective in observing the effects of poor injection profiles. Referring to FIG. 2 in the drawings, a multi-layer reservoir 61 with production well 63 and an injection well 65 is illustrated during flooding operations of secondary production. Downhole sensing and control devices are used to regulate injection into individual layers, in order to prevent early breakthrough of injected fluids and to minimize wasteful cycling of injectants during sweepout of the other layers. This is accomplished by monitoring and controlling flow rates at a number of locations along the injection interval. Alternatively, layers that flood out prematurely can be detected by salinity devices or other detectors spaced along the interval in production well 63.

Figure 3:
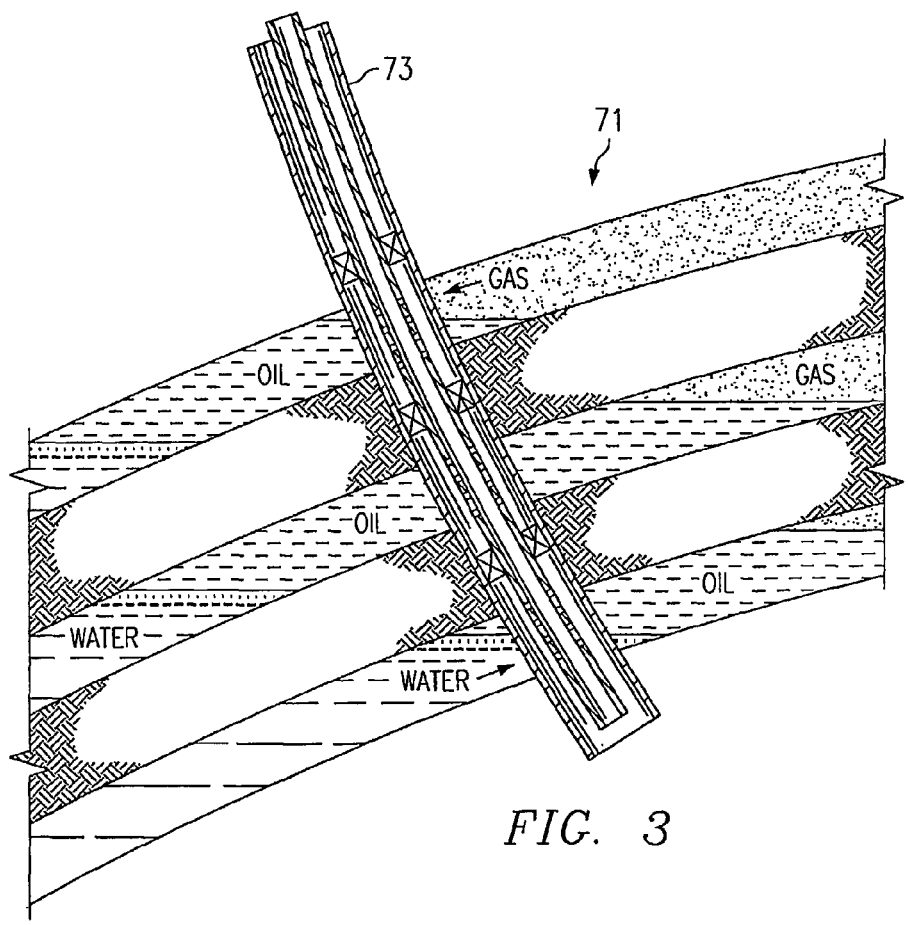
FIG. 3 illustrates primary production operations in a multi-layer reservoir by a production well, the production well experiencing water or gas breakthrough in one layer of the reservoir before another layer is oil depleted.

Referring to FIG. 3 in the drawings, a multi-layer reservoir 71 being produced by a production well 73 is illustrated during primary production. Well 73 is experiencing water or gas breakthrough in one layer of the reservoir before another layer of the reservoir is depleted of oil. By placing downhole equipment and downhole control devices in the layers experiencing water or gas breakthrough, production from these layers can be excluded, thereby permitting continued oil production from layers that are relatively free of gas or water.

The values of downhole data are compared with the reservoir model prediction to determine if the reservoir is operating as expected. When the reservoir operating parameters diverge from expected behavior, new wells may be required, or wells may need to be shut in or abandoned; however, many corrective operations are potentially attainable with the proposed downhole control devices.

Figure 4:
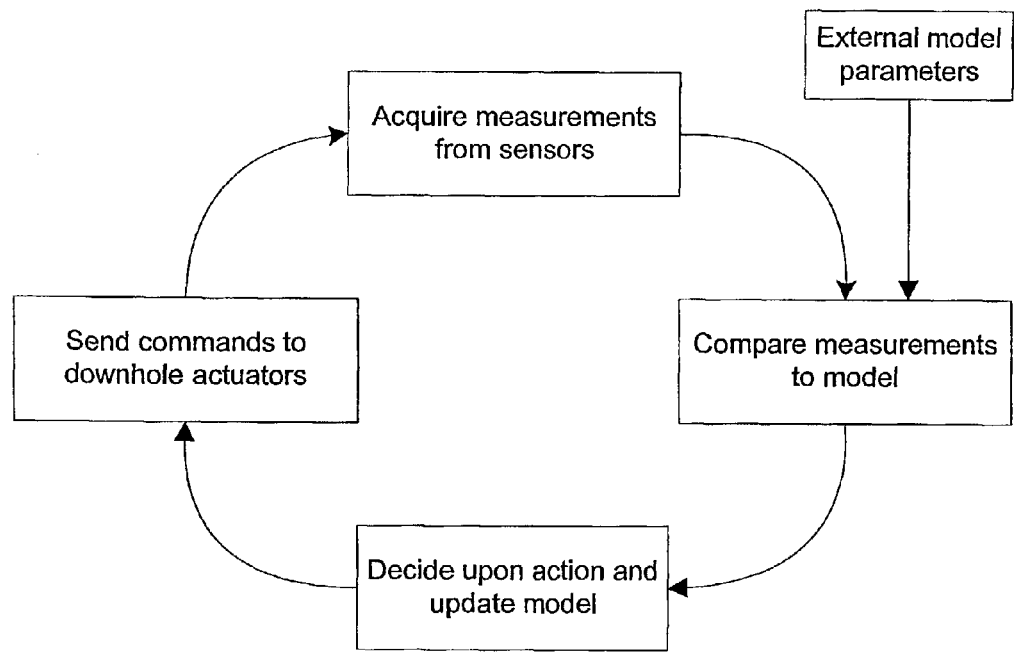
FIG. 4 is a flow diagram illustrating the measurement, modeling, and control actions method for closed-loop control of an individual well or a field.

FIG. 4 illustrates a measurement and control sequence appropriate to such corrective actions. As illustrated in FIG. 4, such a sequence is cyclic:

Measurements from downhole and surface sensors are collected and passed to the model;

The model may be updated from an external data source, for instance to alter desired production rate, and the measurements are compared to the model;

Based on the results of the comparison, decisions are taken on any action which may be required, and the model parameters are updated;

Any decisions for action are translated into commands which are transmitted to downhole actuators, and the cycle returns to the measurement step.

Reservoir management is not limited to optimization of a single field. Referring again to FIG. 1, a second central computer 77 and a third central computer 79 are associated with a second reservoir and a third reservoir, respectively. Similar to central computer 51, the second and third central computers 77, 79 monitor downhole data and surface data over individual downhole communication networks (not shown) and individual surface communication networks (not shown). The data collected by second central computer 77 and third central computer 79 are integrated with that data collected by central computer 51 over a remote communication network 91. The integration of data among the central computers 51, 77, 79 could include data for all of the fields operated by a particular company. This data can then be integrated and analyzed in conjunction with economic data 93 and world-wide economic trends, such as oil prices and supplies, national production controls, pipeline and tanker capacities, and location storage limitations. The overall effect of having large amounts of information and control in a central location by efficient wireless devices would allow effective optimization of production from all of a company's assets.

We claim:

1. A reservoir production control system comprising:
    a plurality of wells disposed on a reservoir, each well having a borehole and at least one piping structure located within the borehole;
    a central computer for collecting downhole data from one or more wells;
    a downhole communication network associated with one or more wells, the downhole communication comprising electrically isolated portions of the piping structure defined by electrical chokes;
    a surface communication network comprising a plurality of interconnected pipes located between the downhole communication network and the central computer for communicating information between the downhole communication network and the central computer;
    wherein the central computer receives downhole data via the downhole communication network and the surface communication network; and
    wherein communication occurs between the downhole communication network and the central computer by passing communication signals along electrically isolated sections of the interconnected pipes.

2. The production control system according to claim 1, wherein:
    the downhole data collected from the wells is compared to a reservoir model; and
    wherein a selected well of the plurality of wells is adjusted to optimize production of the reservoir.

3. The production control system according to claim 1, wherein the surface communication network includes wiring that electrically connects the downhole communication network to the central computer.

4. The production control system according to claim 1 wherein the electrically isolated sections of interconnected pipe are created by placing ferromagnetic chokes at selected locations along the pipe, the ferromagnetic chokes circumferentially surrounding the pipe and impeding current flow through the pipe.

5. The production control system according to claim 1, wherein communication and power transmission within the downhole communication network occurs along an electrically isolated section of the tubing string.

6. The production control system according to claim 5, wherein the electrically isolated section of the tubing string is located between a first and a second ferromagnetic choke disposed circumferentially around the tubing string, both ferromagnetic chokes impeding current flow along the tubing string.

7. The production control system according to claim 1, further comprising:
    a second central computer for collecting downhole data from a second reservoir;
    wherein the second central computer is electrically connected to the first central computer via a remote communication network; and
    wherein the downhole data collected by the first and second central computers is analyzed and used to collectively optimize the production of the first and second reservoir.

8. A reservoir production control system comprising:
    a plurality of wells for producing a reservoir, each well having a borehole extending from the surface, and at least one piping structure located within the borehole;
    at least one downhole data pod located within the borehole of one of the wells for monitoring downhole data about downhole physical characteristics of the well;
    at least one surface data pod for monitoring surface data;
    a central computer for collecting the surface data from the surface data pod and the downhole data from the downhole data pod;
    a downhole communication network for transmitting alternating current electrical power and communication signals along an electrically isolated portion of the piping structure of the one or more wells from the downhole data pod to the surface of the one or more wells;
    a surface communication network electrically connected between the surface of the well and the central computer;
    wherein the surface communication network comprises a plurality of interconnected pipes having electrically isolated portions for communicating information between the surface of the well and the central computer;
    wherein the downhole data and the surface data is analyzed by the central computer to optimize production of the reservoir.

9. The production control system according to claim 8, further comprising:
    a second central computer for collecting downhole data and surface data associated with a second reservoir, the second computer receiving the data over a second surface communication network; and
    wherein the second central computer is electrically connected to the first central computer.

10. The production control system according to claim 8, further comprising:
    a second central computer for collecting downhole data and surface data associated with a second reservoir, the second computer receiving the data over a second surface communication network;
    wherein the second central computer is electrically connected to the first central computer over a remote communication network; and wherein the downhole and surface data collected by the second computer and the downhole and surface data collected by the first central computer are analyzed to optimize the production of both the first reservoir and the second reservoir.

11. The production control system according to claim 10, wherein economic data is also provided to one of the central computers, the economic data being considered in conjunction with the surface data and the downhole data from both reservoirs to collectively optimize the production of the first reservoir and the second reservoir.

12. The production control system according to claim 11, wherein the economic data is information on petroleum prices.

13. The production control system according to claim 11, wherein the economic data is information on petroleum supplies.

14. The production control system according to claim 11, wherein the economic data is information on national production controls.

15. The production control system according to claim 11, wherein the economic data is information on pipeline capacities.

16. The production control system according to claim 11, wherein the economic data is information on tanker capacities.

17. The production control system according to claim 11, wherein the economic data is information on location storage limitations.

18. The production control system according to claim 8, further comprising at least one downhole control device electrically connected to the downhole communication network, the downhole control device receiving instructions from the central computer to assist in optimizing the production of the reservoir.

19. The production control system according to claim 18, wherein the downhole control device is a controllable gas-lift valve disposed along the tubing string of the well.

20. The production control system according to claim 18, wherein the downhole control device is an electric submersible pump.

21. The production control system according to claim 18, wherein the downhole control device is a chemical treatment injector.

22. The production control system according to claim 18, wherein the downhole control device is an inflow control device.

23. The production control system according to claim 8, wherein at least one of the wells is a conventional production well.

24. The production control system according to claim 8, wherein at least one of the wells is an injection well.

25. The production control system according to claim 8, wherein at least one of the wells is a multi-lateral production well.

26. The production control system according to claim 8, wherein at least one of the wells is a data observation well.

27. A method for controlling the production of a reservoir having a plurality of wells for producing the reservoir, each well having a borehole extending from the surface, and a tubing string inserted in the borehole, the method comprising the steps of:

(a) communicating downhole data from a downhole pod in at least one of the wells to the surface along a downhole communication network utilizing an electrically isolated portion of the tubing string;

(b) providing a central computer for collecting the downhole data from one or more wells;

(c) communicating the downhole data from the surface of the well to the central computer along a surface communication network; and (d) analyzing the downhole data and communicating instructions from the central computer to at least one of the wells to change selected operating parameters of the well;

wherein communicating occurs by passing communication signals along electrically isolated sections of the interconnected pipes.

28. The method according to claim 27 further comprising the step of comparing the downhole data collected by the central computer to a reservoir model.

* * * * *